United States Patent [19]

Lusignan

[11] Patent Number: 5,649,318
[45] Date of Patent: Jul. 15, 1997

[54] APPARATUS FOR CONVERTING AN ANALOG C-BAND BROADCAST RECEIVER INTO A SYSTEM FOR SIMULTANEOUSLY RECEIVING ANALOG AND DIGITAL C-BAND BROADCAST TELEVISION SIGNALS

[75] Inventor: Bruce B. Lusignan, Palo Alto, Calif.

[73] Assignee: Terrastar, Inc., Chicago, Ill.

[21] Appl. No.: 409,981

[22] Filed: Mar. 24, 1995

[51] Int. Cl.$^6$ ............................................. H04N 5/262
[52] U.S. Cl. ................................. 455/3.2; 348/725
[58] Field of Search .................... 348/554, 555, 348/705, 706, 725; 364/919.3; 455/3.2, 142, 143; H04N 5/262, 5/46, 3/27

[56] References Cited

U.S. PATENT DOCUMENTS

| | | | |
|---|---|---|---|
| H740 | 2/1990 | Gutleber | 342/384 |
| Re. 32,905 | 4/1989 | Baran | 370/104 |
| 4,085,368 | 4/1978 | Yeh | 325/304 |
| 4,112,721 | 9/1978 | Takase et al. | 72/12 |
| 4,249,181 | 2/1981 | Lee | 343/100 |
| 4,343,005 | 8/1982 | Han et al. | 343/781 |
| 4,376,940 | 3/1983 | Miedema | 343/840 |
| 4,479,129 | 10/1984 | Skahill | 343/781 |
| 4,567,485 | 1/1986 | Oshima et al. | 343/358 |
| 4,573,051 | 2/1986 | Farina | 343/18 E |
| 4,748,636 | 5/1988 | Kato | 375/1 |
| 4,811,021 | 3/1989 | Yoshimoto et al. | 342/361 |
| 4,837,786 | 6/1989 | Gurantz et al. | 370/20 |
| 4,901,307 | 2/1990 | Gilhousen et al. | 370/18 |
| 4,905,221 | 2/1990 | Ishyoshi | 370/18 |
| 4,941,048 | 7/1990 | Hartson et al. | 348/554 |
| 4,968,969 | 11/1990 | Drabowitch et al. | 342/188 |
| 4,985,772 | 1/1991 | Long et al. | 348/554 |
| 5,073,900 | 12/1991 | Mallinckrodt | 375/1 |
| 5,083,205 | 1/1992 | Aria | 348/555 |
| 5,127,021 | 6/1992 | Schreiber | 375/1 |
| 5,177,604 | 1/1993 | Martinez | 358/86 |
| 5,206,954 | 4/1993 | Inoue et al. | 455/6.2 |
| 5,257,106 | 10/1993 | Maruoka | 348/706 X |
| 5,262,788 | 11/1993 | Drabowitch et al. | 342/188 |
| 5,289,285 | 2/1994 | Kotaka et al. | 348/138 |
| 5,289,497 | 2/1994 | Jacobson et al. | 375/1 |
| 5,296,862 | 3/1994 | Rodeffer et al. | 342/359 |

(List continued on next page.)

FOREIGN PATENT DOCUMENTS

| | | | |
|---|---|---|---|
| 529210 | 8/1956 | Canada | 343/781 |

*Primary Examiner*—John K. Peng
*Assistant Examiner*—Nathan J. Flynn
*Attorney, Agent, or Firm*—Kenyon & Kenyon

[57] ABSTRACT

An adapter for a direct broadcast television system enables owners of existing dish antennas to receive both current analog television broadcasts and new digital television broadcasts via C-Band satellites. The adapter includes a coaxial switch for switching between analog and digital television, a tuneable demodulator for selectively switching between transponders on the C-Band satellites, a channel selector unit for selecting the channel specified by the user from the bit stream output by the demodulator, a channel expander for decompressing the video signal, and a control unit for accepting user commands and controlling the polarization of the received signals, the steering of the TVRO antenna, the demodulated transponder frequency and the demultiplexed channel. The ability to select the user's channel from multiple channels available on different transponders and different satellites allows the dynamic reassignment of television channels based on system efficiency considerations. The adapter described herein permits a smooth transition from existing television service to a new digital C-Band television service, without requiring a new antenna or removal of the existing antenna. The device is able to simultaneously serve analog and digital TV to both cable and TVRO and C-Band small antennas and enables a smooth, seamless conversion to digital C-Band receivers with only one box. In addition, the system design minimizes satellite costs and equipment conversion costs. Rapid change to 8 channels per transponder for TVRO and cable is then followed by reduction to 3 and 4 channels to permit use of small C-Band antennas without interrupting service to existing customers.

31 Claims, 3 Drawing Sheets

U.S. PATENT DOCUMENTS

| | | | |
|---|---|---|---|
| 5,351,060 | 9/1994 | Bayne | 343/766 |
| 5,351,130 | 9/1994 | Dugan et al. | 358/725 |
| 5,351,239 | 9/1994 | Black et al. | 370/84 |
| 5,361,099 | 11/1994 | Kim | 348/555 |
| 5,376,941 | 12/1994 | Fukazawa et al. | 342/357 |
| 5,379,320 | 1/1995 | Fernandes et al. | 375/1 |
| 5,386,226 | 1/1995 | Chanteau | 348/10 |
| 5,386,587 | 1/1995 | Yuzawa | 455/3.2 |
| 5,414,431 | 5/1995 | McCoskey | 342/352 |
| 5,416,534 | 5/1995 | Hayashi et al. | 348/706 X |
| 5,461,427 | 10/1995 | Duffiel et al. | 348/555 |
| 5,491,472 | 2/1996 | Kurtz | 348/706 X |

APPARATUS FOR CONVERTING AN
ANALOG C-BAND BROADCAST RECEIVER
INTO A SYSTEM FOR SIMULTANEOUSLY
RECEIVING ANALOG AND DIGITAL C-
BAND BROADCAST TELEVISION SIGNALS

BACKGROUND OF THE INVENTION

The present invention relates generally to converters for direct-to-home (DTH) satellite broadcast television systems, and more particularly to a converter for a DTH satellite broadcast television system for receiving C-band broadcasts.

Currently, about 4 million households in the United States employ a large television receive only (TVRO) satellite dish antenna for receiving C-Band television broadcast programming. These antennae receive transmissions in analog format from a constellation of C-Band geosynchronous satellites, which relay television programs from groundstations to the TVRO dish antennas. The existing C-Band broadcasting systems employ a converter (or receiver) located near the television to output a television channel specified by the viewer to a television or video cassette recorder (VCR). The converter is connected to the TVRO dish via a long coaxial cable that runs from the converter to the equipment (termed the outdoor unit) mounted outside near the TVRO dish. The coaxial cable may in addition be assembled with other cables and signals, at least one of which carries a control signal to the antenna to select the polarization of the RF signals, since the RF signals transmitted from the satellite are either vertically or horizontally polarized. The coaxial cable may also be assembled with a cable that carries a control signal to the antenna to steer the antenna from inside the house. Since these TVRO dishes are large, automatic steering is often used to avoid the inconvenience of climbing on the roof and resteering the antenna if broadcasts from a different satellite are desired.

While digital technology has been in use in telecommunications for some time, its use has been mostly limited to voice and data applications, until recently. Converting voice-grade signals into a digital format was relatively easy, but the task of digitizing video signals efficiently presented a much greater technological challenge.

Video signals that are digitized but not compressed require high bit rates. Consequently, they use the same amount or more of RF spectrum bandwidth as the analog formats they were attempting to replace. While other benefits would ensue from simply converting analog video signals to digital video signals, such as improved quality, the resulting increase in bandwidth and power from this conversion would increase satellite costs dramatically.

The advent of digital chip technology and sophisticated video data compression algorithms makes it possible for broadcasters to squeeze a digital video signal into far less spectrum bandwidth. Multiple video signals that were compressed using these data compression algorithms can now fit into the bandwidth reserved for a single analog video signal. Thus, the cost of satellite distribution decreases because less bandwidth is required for each video feed. Consequently, digital television is or soon will be available to the public. Unfortunately for the owners of the large TVRO satellite antennas, the advent of digital television may make their TVRO dishes obsolete, i.e., they must now buy new antennas and systems for receiving the new digital television, which is currently being broadcast at frequencies different from that for which these TVRO antennas are designed. The owners of these dish antennas invested upwards of $2500 in their systems, and are less likely to reinvest a similar amount in a new system. Therefore, a transition from analog TV to digital TV will prove to be an expensive proposition for these TVRO dish owners.

The present invention is therefore directed to the problem of developing a converter for use in a direct broadcast television system that will allow simultaneous reception of new digital C-band television and the current analog television signals, without requiring a major investment by the current users of analog television received via TVRO satellite antennas. The present invention is therefore directed to the problem of developing a dual converter that will receive both analog and digital TV so that a smooth and inexpensive transition from analog to digital TV is possible. Furthermore, the present invention is directed to the problem of providing a converter that provides complete flexibility to the broadcast system operator when assigning satellite resources, yet will provide a smooth transition from analog C-Band television to digital C-Band television.

SUMMARY OF THE INVENTION

The present invention solves this problem by providing a converter that receives the format of the new digital television signals, passes the existing analog television signals to an existing receiver, and outputs the desired TV signal to the television, without requiring the user to install a new satellite antenna, or to give up his current system.

The converter of the present invention is coupled between a video device, such as a television or VCR and a receiver for receiving existing analog C-Band broadcast television signals. The converter permits simultaneous reception of both the existing analog television signals and digital C-Band broadcast television signals using a single receiving antenna. To do this, the converter includes a control unit with two operating modes. The control unit receives mode commands from the user for switching the converter into either the analog operating mode for receiving the existing analog television signals or into the digital operating mode for receiving the digital C-Band broadcast television signals. The control unit receives a digital channel selection command from the viewer indicating which digital television channel should be output in the digital operating mode, and outputs a digital channel selection signal, and a transponder selection signal. The converter employs a switch with one input coupled to the outdoor unit for receiving an intermediate frequency (IF) signal output by the outdoor unit, one output coupled to the receiver, and a control input coupled to the control unit, whereby the control unit controls the switch via the control input so that the IF signal is output to a second output in the digital operating mode and the IF signal is output to the first output in the analog operating mode. The converter also includes a demodulator coupled to the second output of the switch, which demodulator receives the IF signal in the digital operating mode, receives the transponder selection signal from the control unit, and demodulates the transmitted bit sequence from the IF signal at the carrier frequency specified by the transponder selection signal. The converter also includes a channel selector, which receives the bit sequence from the demodulator, receives the digital channel selection signal from the control unit, and demultiplexes the bit sequence to form the selected compressed digital television signal. The converter also includes a channel expander, which receives the selected compressed digital television channel and decompresses the selected compressed digital television signal to form the selected digital television signal. A digital-to-analog converter receives the selected digital television signal and converts the selected digital television signal into the analog television-ready signal. An output coupler e.g., coupled to the video device, receives the analog television-ready signal (e.g., NTSC formatted signal) from the digital-to analog converter in the digital operating mode, and receives an additional analog television ready signal from the receiver for receiving the existing analog C-Band broadcast television signals in the analog operating mode, and outputs the analog television-ready signal from the digital-to analog converter in the digital operating mode and outputs the additional analog television-ready signal in the analog operating mode.

An advantageous embodiment of the present invention provides that the control unit outputs a polarization select signal to the receiver for receiving the existing analog C-Band broadcast television signals to change a polarization of the RF signal received by the antenna.

Another advantageous refinement of the present invention provides that the channel selector outputs a data management channel transmitted on each transponder to the control unit, which data management channel contains information regarding programs available on all digital television channels on all satellites and transponders transmitting the digital C-Band broadcast television signals. The data management channel also includes a menu of future programs identified by network ID as well as a content identifier. The content identifier provides a description of the program. The channel "name" provided to the viewer is coupled with the satellite transponder, polarization and frame.

Yet another advantageous embodiment provides that several digital television signals are modulated on each transponder carrier signal using a minimum shift keying modulation technique, and that the demodulator demodulates the RF signal using a minimum shift keying demodulation technique.

Still another advantageous embodiment of the present invention provides that several digital television signals are transmitted by each transponder on each C-Band satellite using one polarization and other digital television signals are transmitted by another transponder in the same radio frequency spectrum on said each C-Band satellite using another polarization, which is orthogonal to the first, and the control unit transmits a polarization select signal to the receiver for receiving the existing C-Band broadcast television signals based on the digital channel selection command received from the user, which polarization select signal determines which polarization the RF signal received by the antenna contains.

Another advantageous embodiment provides that a first RF signal containing several digital television signals is transmitted by one C-Band satellite and a second RF signal containing other digital television signals is transmitted by another C-Band satellite, and the control unit transmits a satellite steering control signal to the receiver based on the digital channel selection command received from the user, which satellite steering control signal determines whether the first RF signal or the second RF signal is received by the antenna.

Another advantageous embodiment provides that each C-Band satellite that is broadcasting digital television channels can dynamically reassign each digital television channel to any transponder on said each C-Band satellite, using any polarization and in any channel location within its multiplexing scheme, and the control unit dynamically modifies the polarization selection signal, the digital channel selection signal and the transponder selection signal based on the program "network" identity information contained in the data management channel to cause the channel selector unit to output the digital television channel specified by "network" name by the viewer via the digital channel selection command.

Another advantageous embodiment provides that the control unit includes a storage unit storing default values and menus of future programs for each digital television channel available on all satellites and all transponders. The default values include a satellite indicator, a transponder indicator, a polarization indicator, and a bit frame assignment as well as the time of the programs. The control unit regularly updates these default values based on information included in the data management channel.

Another advantageous embodiment provides that a caption generator is included, which is coupled to the control unit. The caption generator receives a text message signal from the control unit and outputs a video text signal representing the text message. A picture combiner is coupled to the caption generator and the channel expander, which combiner receives the video text signal from the caption generator and the selected digital television signal from the channel expander and combines the video text signal and the digital television channel into a combined text and video signal.

Another advantageous embodiment provides that a display is included, which is coupled to the control unit for displaying the selected digital television channel number to a viewer.

The present invention also specifies a method for receiving both existing analog C-Band satellite broadcast television signals and digital C-Band satellite broadcast television signals using a single receiving antenna, an existing device for receiving the analog C-Band satellite broadcast television signals and an adapter module coupled to the receiving antenna and the existing device, in which a first plurality of digital television channels are multiplexed into a first bit sequence, a second plurality of digital television channels are multiplexed into a second bit sequence, the first bit sequence is modulated on a first carrier signal and transmitted from a first transponder on a particular C-Band satellite using a first polarization, the second bit sequence is modulated on the first carrier signal and transmitted from a second transponder on the particular C-Band satellite using a second polarization, and the first and second bit sequences also include a data management channel specifying a satellite, a carrier frequency, a polarization and a bit frame assignment for all available digital television channels, including digital television channels being transmitted from other C-Band satellites. The method includes the steps of: (a) switching the adapter module to either an analog reception mode or a digital reception mode based on a mode reception command from a viewer; (b) in the analog reception mode: (i) controlling a switch in the adapter module to couple the received RF signal containing the analog C-Band satellite broadcast television signals from the receiving antenna to the existing device; (ii) receiving a television-ready signal from the existing device; and (iii) providing the television-ready signal as an output from the adapter module; and (c) in the digital reception mode, (i) receiving a digital television channel selection command from a viewer specifying a particular digital television channel to be provided as an output from the adapter module; (ii) determining the carrier frequency, the polarization, and the bit frame assignment for the particular digital television channel based on information contained in the data management channel; (iii) controlling the receiving antenna so that the receiving antenna outputs a polarized RF signal having the particular polarization; (iv)

controlling the switch so that an IF signal corresponding to the polarized RF signal is coupled to a demodulator; (v) controlling the demodulator so that the demodulator demodulates the IF signal at the particular carrier frequency to form a bit sequence; (vi) controlling a channel selector so that the channel selector demultiplexes a compressed version of the digital television channel from the bit sequence output by the demodulator based on the particular bit frame assignment; (vii) restoring the compressed version of the particular digital television channel to the particular digital television channel; and (viii) converting the particular digital television channel to a television-ready signal.

A refinement of the method of the present invention provides that default values of present and future programs are used for the polarization, the transponder carrier frequency and the bit frame assignment, when first switching from the analog reception mode to the digital reception mode, and updates are obtained by reading the data management channel using the default values to determine the correct values for the polarization, the transponder carrier frequency and the bit frame assignment for the selected digital television channel. In this refinement, default values are stored for the polarization, the transponder carrier frequency and the bit frame assignment in the adapter module. Upon first switching from the analog reception mode to the digital reception mode, the control unit updates the default values dynamically with information contained in the data management channel as long as the adapter module remains in the digital reception mode.

Another method of the present invention permits a smooth transition from analog C-band television service to digital C-band television service and then to digital C-band television service to a small receiving antenna. According to the method of the present invention, only a few transponders are converted at first to digital service. Each transponder transmits multiple compressed digital television channels, as well as a data management channel. The data management channel (DMC) contains information regarding all channels available on the digital service, e.g., the satellite, the transponder, the polarization and the frame assignment, as well as present and future programming available on each digital TV channel. Those users with existing TVRO dishes would be able to receive these signals if they used an adapter, as discussed previously. To transition to digital C-band service to small antennas, the data rate on each transponder must be decreased. To do so without reducing the total number of digital TV channels, additional transponders are converted to the digital service. By simply moving some channels to new transponders and updating the DMC, the user is unaffected by such a change. Thus, a smooth transition to digital C-band service from analog C-band service is possible, as well as a smooth transition to digital C-band service to small antennas.

DETAILED DESCRIPTION

Figure 1:
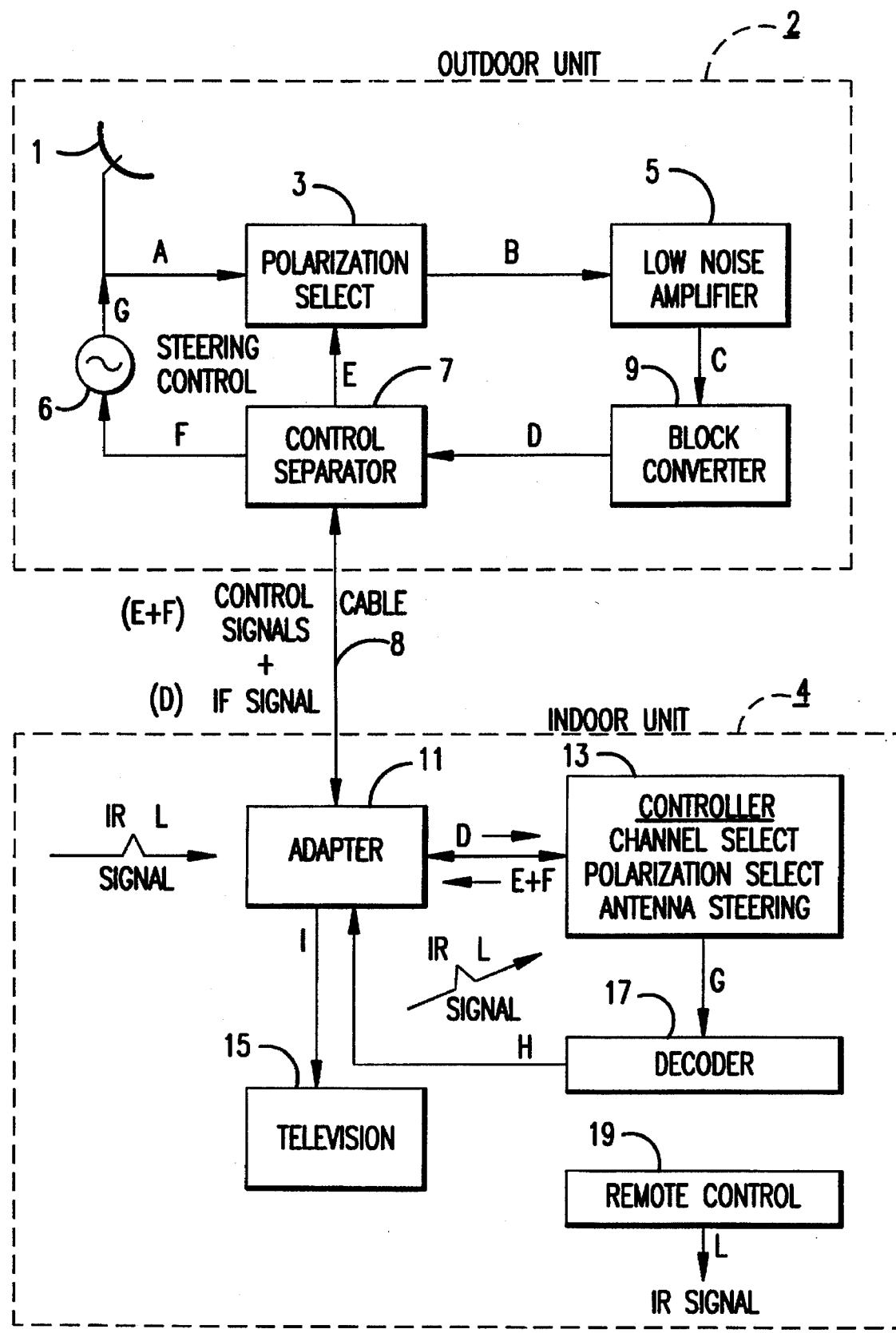
FIG. 1 depicts a system employing the adapter of the present invention to receive both analog and digital C-band television using an existing outdoor unit and parts of an existing indoor unit.

The present invention discloses a system for transmitting and receiving both analog and digital C-band television by existing TVRO parabolic dish antennas. In addition, the architecture of the system permits the operator of the system to dynamically assign digital television channels among the available resources to optimally use these resources. By providing a simple and inexpensive adapter module to permit existing TVRO dish antennas to receive digital television broadcasts, the present invention permits a smooth transition from analog C-band television to digital C-band television, and to digital C-band television for reception by a small receiving antenna. The features that permit these advantages are set forth below.

ANALOG TV BROADCAST SYSTEM

Currently, there are 18 C-Band satellites in geosynchronous orbit broadcasting analog television channels to about four million owners of TVRO dish antennas in the United States. Each of these satellites employs 24 transponders (12 in each of 2 polarizations) in C-Band (3.7 GHz to 4.2 GHz downlink frequency band), with each transponder signal being modulated by a television signal having a bandwidth of 36 MHz. Replacements for these satellites which have yet to be launched will have 36 transponders (18 in each of 2 polarizations), since more frequency bandwidth has been made available by the Federal Communications Commission. Each modulated carrier signal contains one analog television channel. The satellites use one feed to radiate an RF signal having one form of polarization, such as left-hand circular, or vertical, and another feed to radiate another RF signal using a polarization that is orthogonal to the other, such as right-hand circular, or horizontal, respectively. Consequently, there will be about 432 (18×12×2) analog television channels potentially available for reception by these TVRO dishes.

The particulars of the analog television broadcast signal format need not be described in detail here. It is sufficient to state that existing receivers for C-Band television broadcast signals transform these signals into television ready signals, which are usually NTSC formatted signals.

In the analog reception mode, the present invention provides that the RF signals received by the existing TVRO dishes will be relayed without modification to the existing equipment. The resulting television signal output by the existing equipment will be then relayed to the television also without modification. The details of this portion will be described below with reference to FIG. 1.

DIGITAL TV BROADCAST SYSTEM

The system described in U.S. patent application Ser. No. 08/259,980 is hereby incorporated by reference in its entirety, but is not repeated here for brevity purposes. The invention disclosed in that patent application recognized that digital compression techniques permitted a reasonable tradeoff between the number of television channels being transmitted per satellite transponder and the receiving antenna size. Recently developed video compression algorithms permit a possible tenfold increase in the number of digital television channels that can be transmitted in the current bandwidth provided for analog television. Although providing users with ten times as many television choices might on its surface appear desirable, viewers may be overwhelmed with the number of choices available in such a system. For example, simply reviewing the choices available in a system of 4320 channels would take hours. Therefore, trading off some of the increase in the number of possible television channels for some other benefit might not be all that unreasonable. In fact, by reducing the number of television channels being transmitted over the same bandwidth, i.e., spreading less information bits over the same bandwidth, a reduction in the sensitivity of the receiving antenna is possible.

One manifestation of this reduction in receiving sensitivity is a reduction in the surface area of the ground antenna. Consequently, the system described in U.S. patent application Ser. No. 08/259,980 permits a C-Band receiving antenna having the surface area of a three foot parabolic dish. The disclosure of the small receiving antenna in U.S. patent application Ser. No. 08/259,980 is hereby incorporated by reference in its entirety, but is not repeated here for brevity purposes.

The reduction in surface area of the ground antenna for a small reduction in the number of available television channels clearly outweighs any reduction in the possible number of television channels. In fact, the digital television system described herein, and in U.S. patent application Ser. No. 08/259,980, provides more digital television channels than current analog television systems. For example, with digital television 8–12 channels per transponder can be accommodated with the existing TVRO dishes, and 3–4 channels per transponder can be accommodated using the small antenna. This results in an increase in the number of available channels from 432 to something on the order of 1296–1728 (3 to 4×18×24) channels. The maximum possible number of channels would be about 3456–5184 (8 to 12×28×24) channels. Therefore, viewers will be presented with an increase in the number of available channels while simultaneously being presented with a reduction in antenna size. Thus, the cost for this reduction in antenna size of fewer possible channels will never actually be felt by viewers.

While the modulation and compression techniques of the invention described in U.S. patent application Ser. No. 08/259,980 are tailored for the small receiving antenna described above, the resulting signals when broadcast by existing C-Band satellites will be easily received by larger, more sensitive antennas, particularly the existing 3 meter TVRO parabolic dish antennas. These antennas are not confronted with receiving interfering signals from adjacent satellites, since they have a more directional receiving pattern that only encompasses one of the C-Band satellites at a time. These larger antennas will simply have more signal-to-noise ratio (SNR) available for margin than the small antennas for which the system is designed. Therefore, the present invention provides an adapter module for converting the digital television signals into TV ready signals and for switching between analog and digital television so that both types of television signals can be received. The result is that a smooth transition from analog C-band television to digital C-band television is possible, without requiring users to dismantle their current systems.

The invention described in U.S. patent application Ser. No. 08/259,980 provides a unique format for transmitting digital television signals, which can be received either by the small antennas described above or the existing TVRO dishes. The format of the digital TV broadcast RF signal D transmitted from existing C-Band satellites is a minimal shift keyed (MSK) signal, also known as shaped frequency shift keyed (SFSK) signal, centered at a carrier frequency $f_c$ and having a bandwidth of 32 MHz. The carrier frequencies lie between 3.75 GHz and 4.25 GHz. Each C-Band satellite contains multiple transponders; some have as many as 24 transponders (12 on each of 2 polarizations), hence each transponder transmits on a different carrier frequency to prevent interfering with adjacent transponders on the satellite. Each transponder transmits its MSK signal at a unique carrier frequency and one of 2 polarizations using a bandwidth of up to 36 MHz, which does not overlap with the other transponders on the C-Band satellite. The data rate of each signal lies below 36 megabits per second (Mb/s). Consequently, the signal from each transponder carries between 2–12 compressed digital television time domain statistically multiplexed (TDM) channels. The digital television signals are compressed using known video compression techniques, such as MPEG-1 or MPEG-2. The lowest number of channels is suited for signals being transmitted from the lowest power transponder of the C-Band constellation to the new satellite receiving antenna described in U.S. patent application Ser. No. 08/259,980, the description of which is hereby incorporated by reference, while the largest number is suited for signals being transmitted by the highest power transponder to existing large TVRO dish antennas.

FIG 1 depicts one embodiment of the present invention, which includes an outdoor unit 2 and an indoor unit 4. The outdoor unit consists of all existing equipment, i.e., an existing TVRO satellite antenna 1, a steering control 6, a polarization select 3, a low noise amplifier (LNA) 5, a block converter 9 and a control separator 7.

Two different RF signals from the same satellite impinge upon the parabolic dish, one that has one type of polarization and the other than has a type of polarization that is orthogonal to the first. For example, if the satellite transmits circularly polarized signals, then the RF signals are either left-hand circularly (LHC) polarized or right-hand circularly (RHC) polarized. If the satellite transmits linearly polarized signals, then the RF signals are either vertically polarized or horizontally polarized. Most U.S. C-Band analog TV signals are linearly polarized, while many overseas systems transmit signals using circular polarization. Either type can be easily accommodated in the present invention.

To receive the RF signal desired, a dipole antenna located in the feed horn is usually rotated between a position for receiving vertically polarized signals to a position for receiving horizontally polarized signals. The polarization select 3 receives the control signal E from the indoor unit 4, which causes the polarization select 3 to rotate the dipole antenna (not shown) to output the desired RF signal A. Alternatively, two dipoles could be mounted in the feed horn (not shown), and an electronic or mechanical switch can be used to select the desired polarization.

Due to the action of the polarization select 3, the polarized RF signal B is output to the LNA 5, which amplifies the RF signal B. The amplified RF signal C is then output to the block converter 9, which converts the RF transmitted signal to an intermediate frequency (IF). The block converter 9 then outputs the intermediate frequency signal D to the control separator 7, which separates the control signals (E and F) coming from the indoor unit 2 to the steering control 6 (control signal F) and the polarization select 3 (control signal E) from the IF signal D going to the indoor unit 4. The control separator 7 then outputs the intermediate frequency signal D to the coaxial cable 8. The coaxial cable 8 includes either additional coaxial cables or additional wire pairs to carry the control signals E and F.

ADAPTER MODULE

As shown in FIG. 1, the indoor unit 4 includes an adapter module 11 according to the present invention, an existing controller 13, which includes the functions of channel select, polarization select and antenna steering, an existing decoder 17, an existing television 15 and a remote control 19 according to the present invention. The adapter module 11 receives the intermediate frequency signal D from the control separator 7. The adapter module 11 operates in one of two modes, an analog reception mode or a digital reception mode.

In the analog reception mode, the adapter module 11 passes the IF signal D through IF signal D through to the controller 13, which outputs the selected analog TV channel G to the decoder 17. The decoder 17 then performs all necessary functions to convert the received signal G to a television ready formatted signal H, e.g., the decoder 17 decrypts the signal G. The signal H is either at channel 3 or channel 4 in the VHF band, or at baseband. The decoder 17 then outputs the TV ready signal H to the adapter module 11, which in the analog reception mode merely passes the signal H through to the television 15 as signal I.

Figure 4:
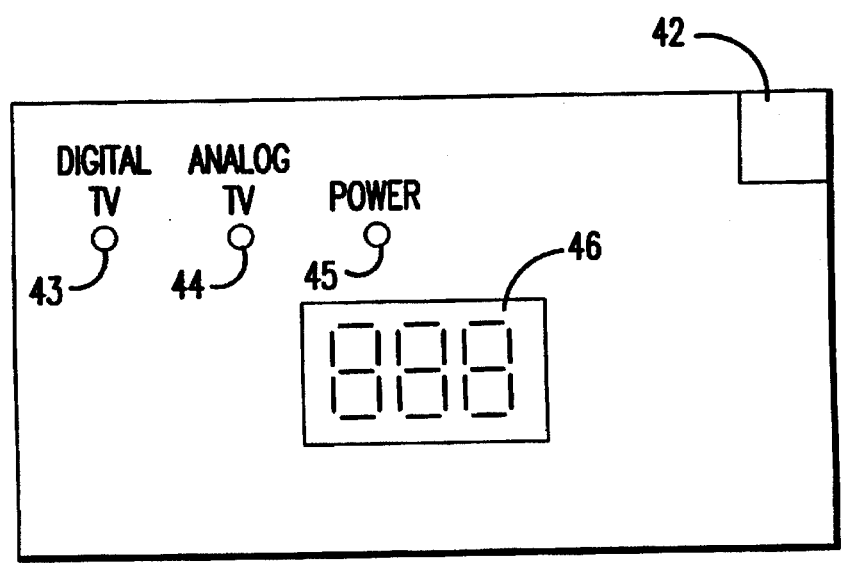
FIG. 4 depicts the front face of the adapter module of the present invention.

The remote control 19 of the present invention allows the user to select a television channel, or to otherwise control the existing analog TV system. When the user selects an analog channel in the analog reception mode, the remote control 19 outputs an infra-red (IR) (or equivalent) signal L, which gets simultaneously transmitted to the adapter module 11 and the controller 13. As shown in FIG. 4, the IR receiver 31 (FIG. 2) has an area 42 in the front face 41 of the adapter module 11 for receiving the IR signal L.

In the analog reception mode, the adapter module 11 ignores the IR signal L, and the controller 13 performs the desired function, e.g., tunes the channel select to the desired channel. Alternatively, the adapter module 11 could pass the IR signal L through to the controller 13, which simplifies the system operation for the user.

In addition, if the controller 13 needs to change the polarization or steer the antenna 1, the controller 13 outputs the control signals (E and F) to the adapter 11 module, which passes these signals (E and F) through to outdoor unit 2 via the coaxial cable 8.

In the digital reception mode, the adapter module 11 performs all of the functions to convert the IF signal D to a TV ready signal I and outputs this signal I to the television 15. The adapter module 11 also receives the IR signal L from the remote control 19, which signal L contains the user specified information. Based on this information, the adapter module 11 outputs the required control signals E and F to change the polarization or to steer the antenna 1.

Figure 2:
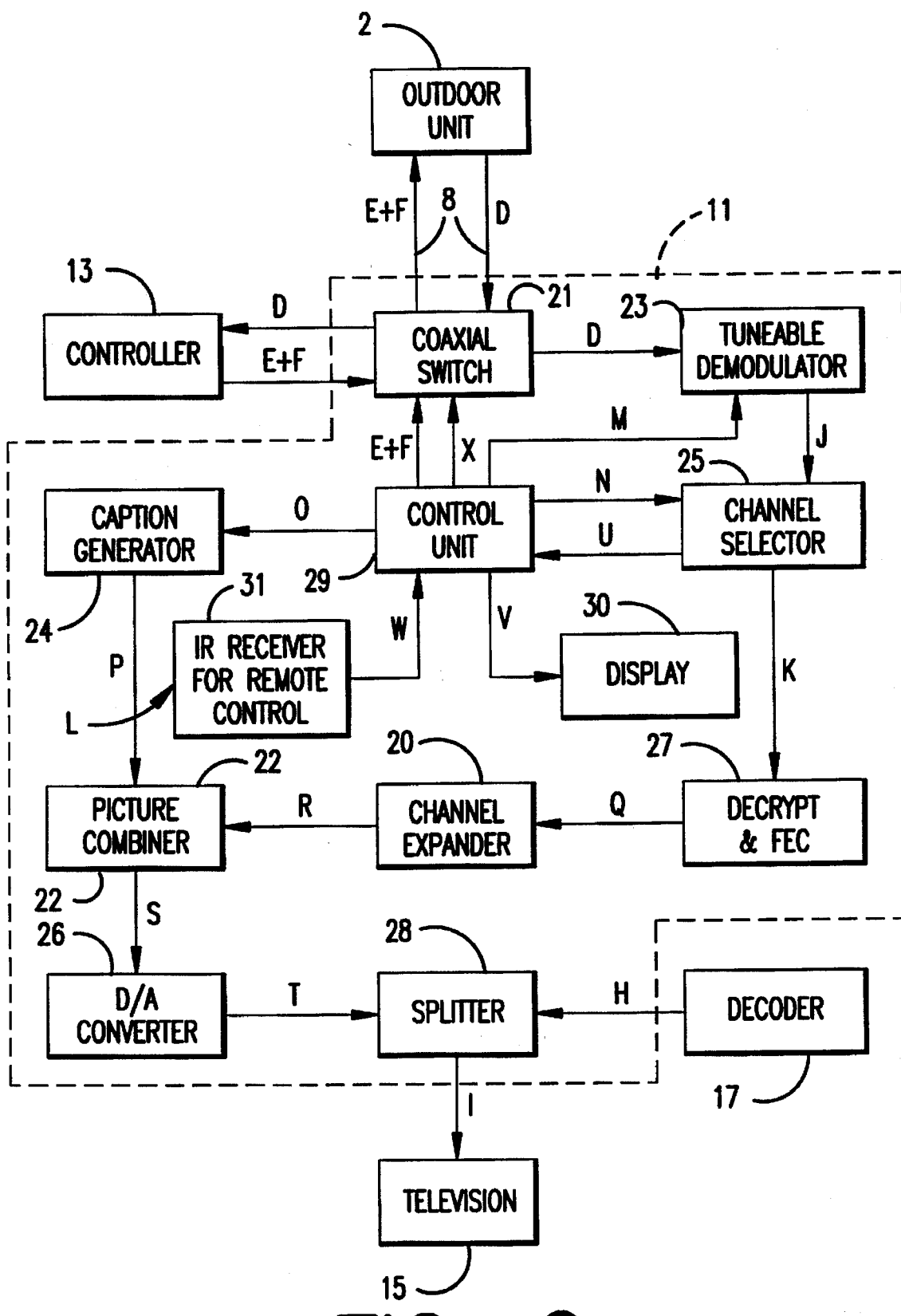
FIG. 2 depicts a block diagram of one embodiment of the adapter of the present invention, as shown in FIG. 1.

FIG. 2 depicts a block diagram of the functional modules inside the adapter module 11, and its connections to existing equipment. The adapter module 11 receives the IF signals D from the outdoor unit 2 via coaxial cable 8. The adapter module 11 also sends the steering control signal F and polarization select signal E to the outdoor unit 2 via the same coaxial cable 8, which may have either additional leads or coaxial cables inside it.

In the analog reception mode, the adapter receives the polarization select signal E and the steering control signal F from the existing controller 13, and passes these signals (E and F) to the outdoor unit 2 as described above. The adapter module 11 also passes the IF signal D through to the controller 13 in the analog reception mode. The existing decoder 17 then returns the TV ready signal H to the adapter module 11, which passes the TV ready signal H to the television 15 in the analog reception mode.

COAXIAL SWITCH

Figure 3:
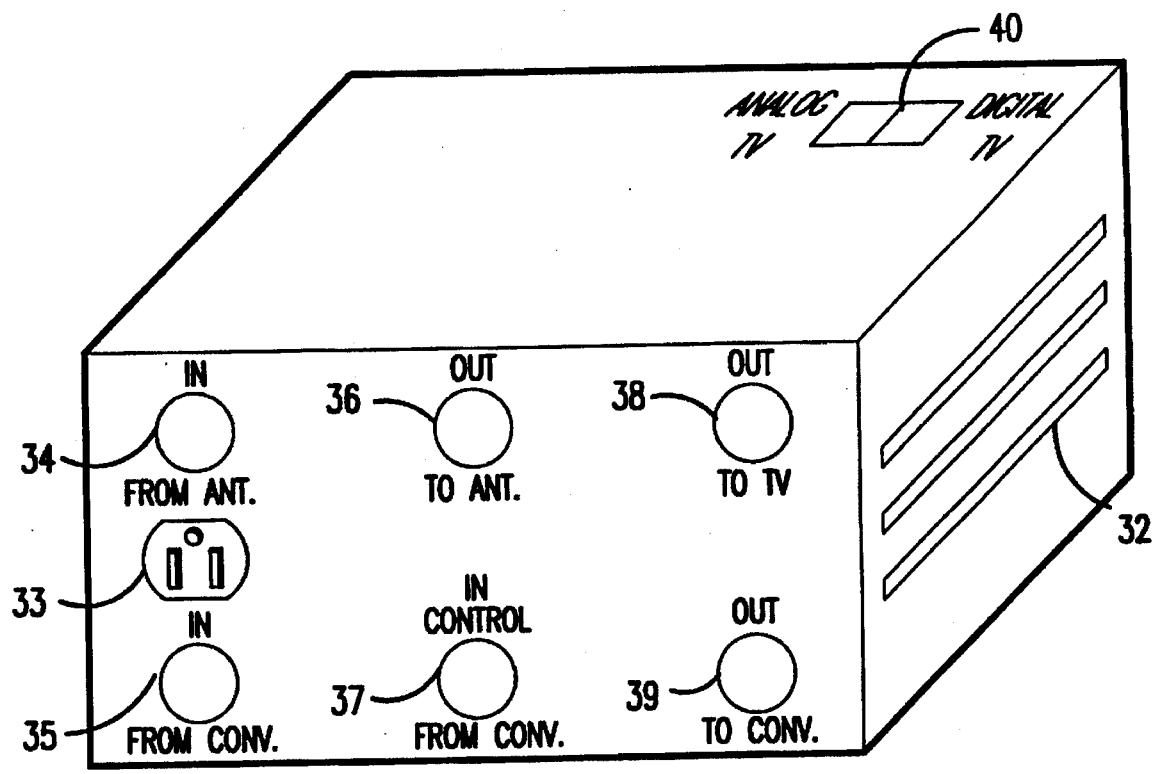
FIG. 3 depicts a rear view of the adapter module of the present invention.

The adapter 11 has a switch setting 40 (FIG. 3) that controls the operation of the adapter 11, i.e., the switch setting determines in which operational mode the adapter 11 is operating. The switch setting can be either a manual switch 40, as shown in FIG. 3, or a user specified command transmitted to the adapter 11 via the IR remote control 19, which transmits IR signal L to the adapter 11. In fact, both switches can be employed to provide for complete flexibility to the user. The control unit then controls the position of the switch 21 via a control signal X.

Once the switch setting is established, a coaxial switch 21 determines the signal flow in and out of the adapter 11. The coaxial switch 21 is a known device, consequently its operation need not be described in detail here. In the analog reception mode, the coaxial switch 21 couples the IF signal D from the coaxial cable 8 through to the controller 13, and couples the control signals E and F from the controller 13 to the outdoor unit 2 via the coaxial cable 8. In the digital reception mode, the coaxial switch couples the IF signal D from the coaxial cable 8 to the tuneable demodulator 23, and couples the control signals E and F from the control unit 29 to the outdoor unit 2 via the coaxial cable 8.

A possible alternative to the first realization is a buffer amplifier from the first coaxial input allowing the incoming signal to go simultaneously to both analog and digital paths.

TUNEABLE DEMODULATOR

The adapter also contains a tuneable demodulator, which in the digital reception mode demodulates the digital IF signal D, at the carrier frequency specified by the control unit 29 via signal M. The digital TV broadcast RF signal D transmitted from the C-Band satellite is the MSK signal described above, centered at a carrier frequency $f_c$ between 3.75 and 4.25 GHz, and having a bandwidth of 32 MHz. Each C-Band satellite contains multiple transponders, and some have as many as 12 transponders, hence each transponder transmits on a different carrier frequency and one of two polarizations to prevent interfering with adjacent transponders on the satellite. Each transponder transmits its MSK signal at a unique carrier frequency using a bandwidth of up to 32 MHz, which does not overlap with the other transponders on the C-Band satellite. The data rate of each signal lies below 36 megabits per second (Mb/s). Consequently, the signal from each transponder carries between 2–12 compressed digital television time domain modulated (TDM) channels.

The control signal M from the control unit 29 determines the carrier frequency for the tuneable demodulator 23. Demodulating MSK signals is known, hence no further description is necessary here. Once the carrier frequency is specified via control signal M, the tuneable demodulator outputs the bit sequence J modulated on the carrier using MSK modulation.

The bit sequence J modulated on the carrier for each transponder contains a data management channel (DMC), which specifies programming information regarding all of the offerings of the digital C-band television system. For example, the DMC contains information about each channel available, even channels that are being broadcast on other transponders or other satellites, or using other polarizations on the same transponder. The DMC also contains the programs being run currently on all channels, as well as all programs running for some time in the near future on all channels available to the user. The DMC is therefore identical on each transponder. Providing the DMC in each transponder permits the user to view listings of programs available without retuning the antenna or steering the antenna to a different satellite. In addition, the receiver can retune to a new channel without requiring viewer input.

The DMC includes the satellite on which each channel is being transmitted, the polarization being used, the transponder being used, and the time slot assignment, or bit frame assignment for each channel. This permits dynamic reassignment of these parameters by the system operator. For example, the system operator may wish to reassign a particular sports channel to a non-sports programming slot, whenever a sports talk show is being run rather than a sports event. Sports programs cannot be compressed as fully as movies due to the high motion content, consequently they consume more system resources than other channels. Therefore, in a digital system the system operator may wish to assign specific channels for sports programs to prevent overloading a satellite transponder. For example, one might assign a ratio of X sports channels for every Y channels (X<Y), to maintain a maximum bit rate per transponder. However, even channels dedicated to sports do not always carry programs that require the higher bit rate, i.e., sports events. Therefore, to maintain efficient use, one might wish to only assign channels actually carrying sports events to a higher bit rate channel assignment. In fact, this would permit broadcasters to opt to pay a premium for higher quality programming, such as the super bowl or a feature movie during ratings week. The DMC allows the system operator complete flexibility in accommodating these concerns on a dynamic basis so that the change is transparent to the viewer.

CHANNEL SELECT

The demodulated bit sequence J is then provided to a channel selector 25, which receives the channel specified by the user via the remote control 19. The channel selector outputs the user selected channel K to a decrypt and FEC unit 27, and outputs the DMC U to the control unit 29.

The channel selector demultiplexes the time-domain multiplexed compressed digital television channels into the individual television channels (2–12) and the DMC. The channels are multiplexed using statistical multiplexing, which is a known technique and need not be described here in detail.

DECRYPT & FEC

The user specified channel K output by the channel select 25 is provided to a decrypt and FEC unit 27, which performs the decryption and forward error correction (FEC) on the selected channel K. The decryption algorithm used can vary with the application, and is merely shown for completeness. Encrypting of the channels permits the system to lock out users who have not paid for a particular channel, yet to provide this channel to users who have paid for this particular channel. For example, a pay-per-view channel might be encrypted, and the decryption code sent to each subscriber who has paid. The FEC algorithm used will also vary with the application, but merely is shown for completeness. The minimum capability required is that a bit error rate of about $10^{-4}$ be correctable. This rate is determined by the acceptable bit error rate for the compressed television signals, which are sensitive to bit errors. Since every bit in a compressed television signal contains significant amounts of information, the quality of a compressed television signal falls sharply with increased bit error rates, compared to the analog channels. Bit error rates beyond this would result in system failure, i.e., the received signal could not be restored without significant artifacts appearing in the television signal. Algorithms exist that provide the necessary capability with reasonable overhead rates. The corresponding encoders and decoders are also available. The resulting corrected and decrypted but compressed digital television signal Q is then output by the decrypt and FEC unit 27 to a channel expander 20.

CHANNEL EXPANDER

The channel expander then performs the necessary decompression of the compressed digital television signal Q, using whatever algorithm was used to compress the signal. For example, if the television channel was compressed using either of the MPEG-1 or MPEG-2 compression techniques this channel expander 20 performs the inverse of that process. The decoders that perform this function for MPEG-1 or MPEG-2 are known, hence no details of how they function are required here. The channel expander 20 then outputs the restored digital television signal R.

PICTURE COMBINER

Since the system of the present invention is a digital television system, the system has the capability of overlaying text messages on the digital television for viewing by the user. One example would be text messages that appear at the bottom of the screen. Another example would be text messages that appear in a corner of the screen. To provide for this capability, the present invention includes a picture combiner 22 that combines text messages 0 output by the control unit 29 to a caption generator 24, which generates the overlay signal P. The overlay signal P is then combined in the picture combiner 22 with the digital television signal R to form a composite digital video signal S. Picture combiners and caption generators are known, hence no further details need be presented here. A possible efficiency option would be to incorporate the caption generator as an integral part of the channel expander software.

DIGITAL-TO-ANALOG CONVERTER

The present invention provides a standard digital-to-analog (D/A) converter 26 to convert the digital video signal S output by the picture combiner to an analog television ready signal T. Since the present invention employs a standard D/A converter, no further details need be provided here.

SPLITTER

The present invention employs a standard splitter 28 or buffer to provide either the TV ready signal H from the analog TV system or the TV ready signal T from the digital TV system to the television set 15. If the viewer selects the analog television reception mode, the adapter 11 will not provide a signal from the D/A converter 26, yet the decoder 17 will output signal H, which gets passed unchanged to the television 15. If the viewer selects the digital television reception mode, the adapter outputs the signal T from the D/A converter 26. Since the IF signal D is not being provided to the controller 13 in the digital reception mode, no signal H should be output from the decoder 17. If, however, this signal H contains undesirable noise due to the specific implementation of the existing analog equipment, a power plug 33 (FIG. 4) can be provided on the adapter into which the power plug 33 for the existing analog equipment can be coupled. Thus, when the user selects the digital reception mode, the adapter module 11 could simply switch the power off to the analog television system, thereby preventing noise from appearing at the splitter 28, where the signal H would normally occur.

CONTROL UNIT

The present invention provides a remote control 19 that will permit the viewer to select analog or digital reception, as well as the channel desired. Since the viewer does not care to know the polarization or other details about each channel, once the viewer selects a channel for viewing, the control unit 29 outputs the desired polarization select signal E, the desired antenna steering signal F, the transponder select signal M and the channel select signal N. This capability permits the system broadcaster to change any of these details of the system, perhaps with the exception of the satellite, without notifying the viewer because the change will be transparent. Resteering the antenna will cause a loss of signal to appear on the screen until the antenna steers to the appropriate location, which can take a few seconds. Therefore, this change would appear to the viewer.

Sports programming often requires more bits per second than movies. Consequently, the system controller responsible for allocating channels to specific transponders can alter the mix of sports channels and other programs to maintain an efficient use of the bandwidth in a dynamic manner, all of which would be transparent to the viewer. In fact, the system could automatically determine that the current mix was inefficient, and modify the mix to an efficient mix, which would be transparent to the viewer. Since broadcasters pay per bit of information transmitted, any broadcast system must pay attention to the use of transmitted capacity so that capacity is not wasted in one transponder and limited in another. The present invention would permit such a dynamic modification of resource allocation, thereby maintaining system costs as low as possible.

This flexibility would allow a relatively quick conversion to digital TV. For example, the system could provide initially 6 to 10 digital channels per transponder to quickly convert cable and TVRO to digital, followed by a return to 3 to 4 channels to accommodate the small antennas and more satellites.

To provide for complete flexibility, the control unit 29 of the present invention includes a storage for storing default values for each digital television channel available. For example, the Table I below provides an example of what might be stored in the control unit.

TABLE I

| Program Channel Name* | Satellite | Polarization | Transponder Frequency | Bit Assignment |
| --- | --- | --- | --- | --- |
| 3 "Net 1" | Galaxy I | Vertical | 3.7 GHz | 1 |
| 4 "Net 2" | Galaxy I | Horizontal | 3.718 GHz | 2 |
| 5 "Net 3" | Galaxy II | Vertical | 3.736 GHz | 3 |
| 6 "Net 4" | Pioneer | Vertical | 4.17 GHz | 7 |

*The terms "Net 1", "Net 2" . . . are intended to designate the popular name of the network. In addition for each half hour for, say two weeks, a program description would be stored, e.g. "The Tale of Blue Beauty", "Mickey Goes to a Party", etc.

Initially, the control unit 29 is programmed with default values at which the system expects to assign each channel. When the adapter module 11 is first turned on, and tuned to a particular digital television channel, the control unit 29 outputs the parameters for that channel stored in its default library. Since the data management channel (DMC) is transmitted on each transponder, as soon as the adapter module 11 receives any signal it will receive the DMC. When the adapter module 11 receives the DMC, it updates its default library so that any changes are instantly accommodated. Therefore, when the viewer then retunes to a different channel, or begins channel surfing, the module will perform the necessary control to ensure that the viewer selected channel is output to the television 15, even if the channel has moved from its default value. At worst, the viewer might experience a brief delay when first turning on the adapter module while the adapter module updates the default values based on the current DMC being received. However, if the television is also turned on at the same time, by the time the television picture first appears the adapter module will have easily completed its modification of its default library.

The library stored in the adapter module contains the list of available channels and current and near-future programming. Since this data is stored, the user can recall this data at his convenience and manipulate it as well. For example, the user can create subsets of data representing only those channels he regularly views. This permits the user to quickly scan his favorite channels for programs of interest. The user could also create sets of data representing types of channels, e.g., sports, comedy, networks, etc., so that he can quickly scan the contents of these channels. Thus, the adapter module includes a user modifiable storage to enable the user to create these lists of channels, i.e., data subsets.

For example, a data rate of 100 kb/s could easily accommodate about 2 weeks of programming in ½ hour increments on all 400 or so channels. A two sentence description for each ½ hour slot could easily be included. Then, via remote control, the user could pull up the list of channels and select or deselect channels from the list and store the resulting list in memory by a name such as Bruce's list. Every time he wished to peruse the list, he could recall his saved list via remote control. The user could specify channels in order of most watched, category, alphabetical (i.e., popular name) or any order. The storage is provided in the control unit 29 in the form of RAM or user modifiable storage. The user's list would simply be output from the controller as text and overlayed on whatever is being viewed. This permits the user to quickly scan his choice without waiting for the information to scroll by, as in current systems.

DISPLAY

The present invention provides a display over which simple information such as which mode was operating and which channel is being output can be transmitted to the user. For example, in the analog mode, the channel being viewed is probably displayed on the current equipment. In the digital mode, this information must be provided to the user. In addition, the user might wish to know in which reception mode the equipment is currently set.

The present invention uses an LED 43 on the front face 41 of the adapter module 11 to display the fact that the system is operating in the digital TV mode. Another LED 44 displays the fact that the system is operating in the analog TV mode. A third LED displays system power. A numerical display 46 displays the digital TV channel being output by the adapter module. This display 46 contains at least three character positions to allow for up to 1000 channels. A fourth LED would permit 10000 channels to be displayed.

IR RECEIVER & TRANSMITTER

The present invention provides an IR remote control 19 for transmitting user selections to the system. An IR receiver 31 receives the IR signal L and converts this into an electrical signal W, which the IR receiver 31 outputs to the control unit 29. The IR transmitter can be used to send commands from the user to modify the channel, and to store/recall the new list in memory under a user specified name.

ADAPTER MODULE MECHANICAL DESIGN

The adapter module 11 is contained in a single housing. FIG. 3 depicts the adapter module 11. The rear face of the adapter module 11 contains a coaxial input 34 for receiving the RF signal D from the outdoor unit 2. Another coaxial input 35 is provided for receiving the TV ready signal H from the decoder 17. A third coaxial input 37 is provided for receiving the control signals (E and F) from the controller 13.

A coaxial output is provided for outputting the control signals (E and F) to the outdoor unit 2. Two other coaxial outputs are provided, one coaxial output 38 for connecting to the television 15 and another for coupling the IF signal D to the controller 13.

A manual switch 40 on the top of the adapter module permits the user to manually switch from the analog TV mode to the digital TV mode, or vice versa. Cooling vents 32 are provided on the sides of the adapter module 11, only one side of which is depicted in FIG. 3. A power plug 33 is provided to allow the user to plug in the existing analog converter so that power can be removed from that converter when necessary by the adapter module.

SYSTEM SIGNAL LIST

Each signal specified in the system is listed below in Table II, with its corresponding description.

TABLE II

| SIGNAL | DESCRIPTION |
|---|---|
| A. | Output by existing TVRO antenna 1, which is either the analog TV RF signals or the new digital TV RF signals, which are being broadcast by all transponders on the C-Band satellite at which the TVRO antenna 1 is aimed. This signal contains both vertically and horizontally polarized RF signals. |
| B. | Output by existing polarization selector unit 3, which selects either the vertical or horizontal polarization signals being transmitted by all of the transponders on the C-Band satellite at which the TVRO antenna 1 is aimed. |
| C. | Amplified version of signal B output by the LNA 5. |
| D. | Signal C converted to intermediate frequency from the RF signal. |
| E. | Polarization select control signal provided from existing system to select vertically or horizontally polarized signals. Also sent from the control unit 29 in the digital reception mode if necessary to select vertically or horizontally polarized signals. |
| F. | Steering control signal provided from existing system to steer the TVRO antenna 1 to a particular satellite. Also sent from the control unit 29 in the digital reception mode if nessasary to steer the TVRO antenna 1 to a desired satellite. |
| G. | Signal from controller 13 to decoder 17 (not part of present invention). |
| H. | Analog TV Ready signal from decoder 17 intended for television 15. |
| I. | Analog or digital TV ready signal in NTSC format from splitter 28. |
| J. | Demodulated bit sequence from tuneable demodulator 23, which contains the entire bit sequence transmitted on one transponder of a particular satellite. This contains the DMC as well as 2–12 TDM compressed digital television channels statistically multiplexed together. |
| K. | Single compressed digital television channel output by the channel select 25. |
| L. | IR signal output by the remote control 19, which signal contains the user commands for the control unit 29. |
| M. | Control signal output by control unit 29 to select a particular transponder on the satellite at which the TVRO is aimed. |
| N. | Control signal output by control unit 29 to select a particular channel specified by the user via the remote control 19 available on the selected transponder. |
| O. | Text messages output by the control unit 29 for overlaying on the picture displayed on the television screen. |
| P. | Caption output by the caution generator 24 based on the text message O sent from the control unit 29. |
| Q. | Compressed, decrypted and error corrected digital television signal output by the decrypt and FEC unit 27. |

TABLE II-continued

| SIGNAL | DESCRIPTION |
|---|---|
| R. | Restored digital television signal output by the channel expander 20. |
| S. | Digital television signal R combined with the caption P generated by the caption generator 24. |
| T. | TV ready signal output by the D/A converter in the digital reception mode. |
| U. | Data management channel (DMC) output by the channel select 25 to the control unit 29. The DMC contains programming information about all of the offerings of the digital television broadcast system. For example, the DMC contains information about each channel available, even channels that are being broadcast on other transponders or other satellites, or using other polarizations on the same transponder. The DMC also contains the programs being run currently on all channels, as well as all programs running for some time in the future on all channels available to the user. The DMC is identical on each transponder. |
| V. | Display signal sent from control unit 29 to the display 30. |
| W. | Electrical version of IR signal L sent to control unit 29 from the IR receiver 31 for the remote control 19. |
| X. | Control signal for switching the position of the coaxial switch. |

Table II

The present invention permits the broadcast operator to transition from analog C-Band service to digital service in a seamless manner without disrupting service to existing customers. First, the new digital service might employ eight to twelve digital television channels per transponder. This would permit existing TVRO dish owners to receive these broadcasts. To transition to the small antennas, the numbers of digital channels per transponder must be reduced. Therefore, additional transponders must be converted to digital television to accommodate the same number of channels. By simply updating the DMC, the adapter module can modify the channel parameters without user intervention. Consequently, this transition will have no impact on existing users while enabling new users with the small antennas to receive the new digital television broadcast. Thus, a rapid and seamless transition to digital TV is possible.

Initially, the digital television service might employ only a few transponders, with each transponder carrying 8–12 compressed digital television channels and the DMC. To transition to digital service to small antennas, the data rate per transponder must be reduced. To avoid dropping channels, some additional transponders must be converted to digital service, which means channels must be moved. Consequently, the user's receiver will track these changes based on the information in the DMC. To transition channels from one transponder to another, the receiver parameters for that channel must be updated simultaneously. The receiver would then retune to the appropriate channel. This permits a smooth transition from analog service to digital service for large TVRO antennas and then ultimately to small C-Band digital service.

The flexibility permitted by the present invention permits the broadcaster to modify the system resources based on current data being transmitted on a dynamic basis. For example, the broadcasting ground station can automatically monitor the bit rate of each transponder. As the transponder bit rate exceeds some threshold, the system could reassign channels among the available transponders to compensate, and then simply update the DMC to reflect this change. This would prevent one transponder from being overloaded. If no room was available on the transponders in use, the system operator could be notified so that additional transponders could be made available, or so that channels could be reassigned to a different satellite. Since the user becomes aware when channels move from one satellite to another due to the necessity of steering the antenna, this type of modification ought to be done as few times as possible. Nevertheless, the system has complete flexibility in assigning resources, even the ability to do so automatically.

What is claimed is:

1. An apparatus for converting an analog C-Band broadcast receiving system into a system for simultaneously receiving analog C-Band broadcast television signals and digital C-Band broadcast television signals, in which the analog C-Band broadcast receiving system includes an antenna, and an analog receiver for converting the received signal to a television ready signal selected by a user, the apparatus being coupled between the antenna and the analog receiver and between the analog receiver and a video device, said apparatus comprising:

a) a control unit having a digital operating mode and an analog operating mode, receiving a mode command from the user for switching the apparatus into either the analog operating mode for receiving the analog C-Band broadcast television signals or into the digital operating mode for receiving the digital C-Band broadcast television signals, receiving a digital channel selection command from the user indicating which digital television channel should be output in the digital operating mode, outputting a digital channel selection signal, and outputting a transponder selection signal;

b) a switch having an input being coupled to the antenna for receiving the signal, having a first output being coupled to said analog receiver, having a second output, having a control input being coupled to the control unit, whereby the control unit controls the switch via the control input so that the received signal is output to the second output in the digital operating mode and the received signal is output to the first output in the analog operating mode;

c) a demodulator being coupled to the second output of the switch, receiving the received signal in the digital operating mode, receiving the transponder selection signal from the control unit, and demodulating a bit sequence from the received signal at a carrier frequency specified by the transponder selection signal;

d) a channel selector receiving the bit sequence from the demodulator, receiving the digital channel selection signal from the control unit, and demultiplexing the bit sequence to form a selected compressed digital television signal;

e) a channel expander receiving the selected compressed digital television channel and decompressing the selected compressed digital television signal to form a selected digital television signal;

f) a digital-to-analog converter receiving the selected digital television signal and converting the selected digital television signal into an analog television-ready signal; and g) an output coupler being coupled to the video device, receiving the analog television-ready signal from the digital-to analog converter in the digital operating mode, and receiving an additional analog television-ready signal from said analog receiver in the analog operating mode, and outputting the analog television-ready signal from the digital-to analog converter in the digital operating mode and outputting the additional analog television-ready signal in the analog operating mode.

2. The apparatus according to claim 1, wherein the control unit provides a polarization select signal to the antenna to change a polarization of the received signal received by the switch.

3. The apparatus according to claim 1, wherein the channel selector outputs a data management channel to the control unit, which data management channel contains information regarding programs available on all digital television channels on all satellites and transponders transmitting the digital C-Band broadcast television signals.

4. The apparatus according to claim 1, wherein several digital television signals are modulated on each transponder carrier signal using a minimum shift keying modulation technique and the demodulator demodulates the received signal using a minimum shift keying demodulation technique.

5. The apparatus according to claim 1, wherein a first plurality of digital television signals are transmitted by each transponder on each C-Band satellite using a first polarization and a second plurality of digital television signals are transmitted by said each transponder on said each C-Band satellite using a second polarization, and the control unit transmits a polarization select signal to said antenna based on the digital channel selection command received from the user, which polarization select signal determines whether the received signal received by the switch contains the first plurality of digital television signals or the second plurality of digital television signals from the satellite at which the antenna is aimed and from the transponder specified by the control unit via the transponder select signal.

6. The apparatus according to claim 1, wherein a first RF signal containing a first plurality of digital television signals is transmitted by a first C-Band satellite and a second RF signal containing a second plurality of digital television signals is transmitted by a second C-Band satellite, and the control unit transmits a satellite steering control signal to said antenna based on the digital channel selection command received from the user, which satellite steering control signal determines whether the first RF signal or the second RF signal is received by the antenna.

7. The apparatus according to claim 5, wherein each C-Band satellite that is broadcasting digital television channels can dynamically reassign each digital television channels to any transponder on said each C-Band satellite, using any polarization and in any channel location within its multiplexing scheme, and said control unit correspondingly dynamically modifies the polarization selection signal, the digital channel selection signal and the transponder selection signal based on information contained in the data management channel to cause the channel selector unit to output the digital television channel specified by the user via the digital channel selection command.

8. The apparatus according to claim 7, wherein the control unit further comprises a storage unit storing a plurality of default values for each digital television channel available on all satellites and all transponders.

9. The apparatus according to claim 8, wherein the plurality of default values include a satellite indicator, a transponder indicator, a polarization indicator, and a bit frame assignment.

10. The apparatus according to claim 9, wherein the control unit regularly updates the plurality of default values based on information included in the data management channel.

11. The apparatus according to claim 1, wherein the control unit includes a storage unit that stores user specified data sets representing a user organized list of available channels.

12. The apparatus according to claim 1, further comprising a picture combiner having an input coupled to the control unit and an output coupled to the digital-to-analog converter, converting a text message signal output by the control unit into a text overlay signal, overlapping the text overlay signal on the selected digital television channel and outputting the text overlayed television signal to the digital-to-analog converter.

13. The apparatus according to claim 12, wherein the control unit further comprises a storage unit, the control unit outputs a master channel list of all available digital channels based on a user command to do so, which master list is overlayed on the selected digital television channel by the picture combiner, and the control unit creates a subset of the available digital channels based on a series of commands sent by the user and stores this list in the storage in a user named file.

14. The apparatus according to claim 13, wherein the control unit retrieves the user name file and outputs it to the picture combiner upon a command to do so from the user.

15. The apparatus according to claim 1, further comprising:
a) a caption generator being coupled to the control unit, wherein the caption generator receives a text message signal from the control unit and outputs a video text signal representing the text message; and
b) a picture combiner being coupled to the caption generator and the channel expander, receiving the video text signal from the caption generator, receiving the selected digital television signal from the channel expander, and combining the video text signal and the digital television channel into a combined text and video signal.

16. The apparatus according to claim 1, further comprising a display being coupled to the control unit for displaying the selected digital television channel number to a user.

17. A method for receiving both analog C-Band satellite broadcast television signals and digital C-Band satellite broadcast television signals using a single receiving antenna, a device for receiving the analog C-Band satellite broadcast television signals and an adapter module coupled to the receiving antenna and the device, in which a first plurality of digital television channels are multiplexed into a first bit sequence, a second plurality of digital television channels are multiplexed into a second bit sequence, the first bit sequence is modulated on a first carrier signal and transmitted from a first transponder on a particular C-Band satellite using a first polarization, the second bit sequence is modulated on the first carrier signal and transmitted from a first transponder on the particular C-Band satellite using a second polarization, and the first and second bit sequences also include a data management channel specifying a satellite, a carrier frequency, a polarization and a bit frame assignment for all available digital television channels, including digital television channels being transmitted from other C-Band satellites, said method comprising the steps of:
a) switching a mode of the adapter module to either an analog reception mode or a digital reception mode based on a mode reception command from a user;
b) in the analog reception mode, including the steps of:
(i) controlling a switch in the adapter module to couple a received RF signal containing the analog C-Band satellite broadcast television signals from the receiving antenna to the device;
(ii) receiving a television-ready signal from the device; and
(iii) providing the television-ready signal as an output from the adapter module; and
c) in the digital reception mode, including the steps of:
(i) receiving a digital television channel selection command from a user specifying a particular digital television channel to be provided as an output from the adapter module;
(ii) determining a particular carrier frequency, a particular polarization, and a particular bit frame assignment for the particular digital television channel based on information contained in the data management channel;
(iii) controlling the receiving antenna so that the receiving antenna outputs a polarized RF signal having the particular polarization;
(iv) controlling the switch so that an intermediate frequency signal corresponding to the polarized RF signal is coupled to a demodulator;
(v) controlling the demodulator so that the demodulator demodulates the intermediate frequency signal at the particular carrier frequency to form a bit sequence;
(vi) controlling a channel selector so that the channel selector demultiplexes a compressed version of the digital television channel from the bit sequence output by the demodulator based on the particular bit frame assignment;
(vii) restoring the compressed version of the particular digital television channel to the particular digital television channel; and
(viii) converting the particular digital television channel to a television-ready signal.

18. The method according to claim 17, wherein the digital reception mode further comprises the steps of:
(ix) using default values for the particular polarization, the transponder carrier frequency and the bit frame assignment, upon first switching from the analog reception mode to the digital reception mode; and
(x) reading the data management channel using the default values to determine the particular polarization, the particular transponder carrier frequency and the particular bit frame assignment for the particular digital television channel.

19. The method according to claim 17, wherein the digital reception mode further comprises the steps of:
(ix) storing default values for the particular polarization, the transponder carrier frequency and the bit frame assignment in the adapter module;
(x) using the default values for the particular polarization, the transponder carrier frequency and the bit frame assignment, upon first switching from the analog reception mode to the digital reception mode; and
(xi) updating dynamically the default values with information contained in the data management channel as long as the adapter module remains in the digital reception mode.

20. The method according to claim 19, wherein the digital television channels are reassigned dynamically at least among a plurality of C-Band satellite transponders, all available polarizations and all available bit frame assignments, and further comprising the steps of:
(xii) repeating steps c) (iii) and c) (v) through c) (viii) whenever the default values for the particular digital television channel are changed by said updating in step (ix).

21. A converter for coupling to an analog satellite television receiver, which includes an outdoor unit coupled to a satellite antenna and an indoor unit for coupling to a television or other video device, said converter comprising:

a) a coaxial switch having a first input being coupled to the outdoor unit for receiving a polarized intermediate frequency (IF) signal, having a second input being coupled to the indoor unit for receiving a steering control signal, having a third input being coupled to the indoor unit for receiving a polarization select signal, having a fourth input for receiving a second steering control signal, having a fifth input for receiving a second polarization select control signal, having a control input for switching the switch between a first position and a second position, having a first output being coupled to the indoor unit for providing the polarized IF signal to the indoor unit, having a second output being coupled to the outdoor unit for providing the steering control signal to the outdoor unit, having a third output being coupled to the outdoor unit for providing the polarization select signal to the outdoor unit, and having a fourth output for the polarized IF signal, wherein in the first position the coaxial switch couples the first input to the first output, couples the second and third inputs to the second and third outputs, respectively, and in the second position the coaxial switch couples the first input to the fourth output, and couples the fourth and fifth inputs to the second and third outputs, respectively;

b) a tuneable demodulator having a first input being coupled to the fourth output of the coaxial switch for receiving the polarized IF signal, having a second input for receiving a transponder select signal, and providing a bit sequence as an output, which bit sequence was modulated on a carrier frequency using a minimum shift keying modulation technique;

c) a demultiplexer having a first input being coupled to the output of the tuneable demodulator, having a second input for receiving a bit frame assignment for determining which compressed digital television channel within the bit sequence received from the tuneable demodulator is to be output, providing a compressed digital television signal as a first output, and providing a data management channel as a second output, which data management channel contains information necessary to receive all available digital television channels being broadcast from C-Band satellites in a particular viewing region;

d) a video decompressor having an input being coupled to the output of the demultiplexer and providing a restored version of the compressed digital television signal;

e) a digital-to-analog converter having an input being coupled to the video decompressor, converting the restored version of the compressed digital television signal to a video signal and providing the video signal as an output;

f) a splitter having a first input being coupled to the indoor unit for receiving a selected analog television signal, having a second input being coupled to the output of the digital-to-analog converter for receiving the video signal, and having an output for coupling to the television or other video device; and g) a controller having a first input being coupled to the demultiplexer for receiving the data management channel, having a second input for receiving commands from a user, having a first output being coupled to the fourth input of the coaxial switch for sending the second steering control signal to the coaxial switch, having a second output being coupled to the fifth input of the coaxial switch for sending the second polarization select control signal to the coaxial switch, having a third output being coupled to the control input of the coaxial switch for controlling the position of the coaxial switch, having a fourth output being coupled to the second input of the tuneable demodulator for sending the transponder select signal to the tuneable demodulator, having a fifth output being coupled to the second input of the demultiplexer for sending the bit frame assignment, wherein upon a receipt of a command from the user to output a particular digital television signal, the control unit switches the coaxial switch via the control input to the second position, determines a first value for the steering control signal, a second value for the polarization select signal, a third value for the transponder select signal, and a fourth value for the bit frame assignment based on information contained in the data management channel, and outputs the first, second, third, and fourth values as the first, second, fourth and fifth outputs, respectively.

22. The converter according to claim 21, further comprising a decryptor unit having an input being coupled to the first output of the demultiplexer, and having an output being coupled to the digital-to-analog converter, wherein the compressed digital television signal is in encrypted form, and the decrypter unencrypts the compressed digital television signal and provides the unencrypted compressed digital signal as an output.

23. The converter according to claim 21, further comprising an error correction unit having an input being coupled to the first output of the demultiplexer, and having an output being coupled to the digital-to-analog converter, wherein the error correction unit corrects errors in the compressed digital television signal and provides the corrected compressed digital signal as an output.

24. The converter according to claim 21, further comprising text overlaying device having a first input being coupled to the control unit for receiving text messages from the control unit, having a second input for receiving the restored version of the compressed digital television signal and providing a combined text and video digital television signal as an output to the digital-to-analog converter.

25. A method for converting from analog C-Band television service to digital C-band television service without interrupting service to users, comprising:

a) converting a first transponder on a satellite to digital television service by modulating a first plurality of compressed digital television channels and a data management channel on a first carrier frequency for the first transponder, wherein the data management channel contains information for all channels provided by the digital C-Band television service, which information includes receiver parameters necessary to receive each of the first plurality of compressed digital television channels;

b) switching between analog C-Band television service and digital C-Band television service in an adapter module in response to a service selection signal from a user;

c) receiving a digital television channel selected by the user by modifying a digital receiver according to the receiver parameters for the digital television channel selected by the user contained in the data management channel;

d) converting a second transponder on the satellite to digital television service by modulating a second plurality of compressed digital television signals and said data management channel on a second carrier frequency for the second transponder;

e) updating the information in the data management channel to provide updated receiver parameters necessary to receive each of the compressed digital television channels in the first and second plurality of digital television channels; and f) modifying the digital receiver according to the updated receiver parameters.

26. The method according to claim 25 further comprising the steps of:

g) moving a subset of the channels in the first plurality of compressed digital television channels to the second plurality of compressed digital television channels while simultaneously performing the step d) of converting.

27. The method according to claim 26, wherein the number of channels in the first and second plurality of compressed digital television channels after step g) of moving is performed is the same as the number of channels in the first plurality of compressed digital television signals before the steps g) and d) are performed.

28. The method according to claim 25, further comprising the steps of:

g) simultaneously reducing the number of channels in the first plurality of compressed digital television channels while increasing the number of transponders converted according to step d) of converting so that the total number of compressed digital television signals provided by the digital television service never decreases.

29. The method according to claim 28, wherein steps e) and f) are continuously performed so that user intervention is not required when step g) is performed.

30. An adapter for coupling to a TVRO antenna and an indoor unit of a C-band satellite broadcast receiving system to allow reception of both analog C-band television programming, and digital C-band television programming, said adapter comprising:

a) means for switching between a first mode for receiving the analog C-band television programming and a second mode for receiving the digital C-Band television programming;

b) means for passing the analog C-band television programming to the indoor unit in the first mode;

c) means for receiving the digital C-band television programming in the second mode; and d) means for controlling the switching means and the receiving means based on a viewer preference.

31. An apparatus for converting an analog C-band receiver into an analog and digital C-band receiver, comprising:

a) a first input for receiving a television signal containing with either an analog signal or a digital signal;

b) a second input for receiving a viewer channel selection signal indicating whether a viewer has selected a digital television channel or an analog television channel;

c) a first output for outputting the television signal when the viewer channel selection signal indicates the viewer has selected an analog television channel, said first output for coupling to said analog C-band receiver;

d) a second output for outputting a television-ready signal, said second output for coupling to a video device;

e) a third input for receiving a television-ready signal from the analog C-band receiver;

f) a digital C-band receiver converting the digital signal into a second television-ready signal and outputting a second television-ready signal to the second output when the viewer channel selection signal indicates the viewer has selected a digital television channel, wherein said second output outputs either the first or second television-ready signal depending on whether the viewer has selected an analog or digital television channel, respectively.

* * * * *

UNITED STATES PATENT AND TRADEMARK OFFICE
CERTIFICATE OF CORRECTION

PATENT NO. : 5,649,318

DATED : 15 July 1997

INVENTOR(S) : Bruce B. LUSIGNAN

It is certified that error appears in the above-identified patent and that said Letters Patent is hereby corrected as shown below:

| Column | Line | |
|---|---|---|
| 1 | 23 | Change "rum" to --runs--. |
| 9 | 7 | Delete "IF signal D through" (second occurrence). |

Signed and Sealed this

Twelfth Day of May, 1998

Attest:

BRUCE LEHMAN

*Attesting Officer*     *Commissioner of Patents and Trademarks*